fan Lee

United States Patent
Sakai (10) Patent No.: US 8,953,233 B2
(45) Date of Patent: Feb. 10, 2015

(54) IMAGE READING APPARATUS AND IMAGE DATA PROCESSING METHOD

(75) Inventor: Takashi Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 13/108,913

(22) Filed: May 16, 2011

(65) Prior Publication Data
US 2011/0304893 A1 Dec. 15, 2011

(30) Foreign Application Priority Data

Jun. 14, 2010 (JP) ................ 2010-135511

(51) Int. Cl.
| H04N 1/46 | (2006.01) |
| H03F 3/08 | (2006.01) |
| H04N 1/10 | (2006.01) |
| H04N 1/193 | (2006.01) |
| H04N 1/60 | (2006.01) |

(52) U.S. Cl.
CPC ............. *H04N 1/1017* (2013.01); *H04N 1/193* (2013.01); *H04N 1/46* (2013.01); *H04N 1/60* (2013.01)
USPC ........... 358/509; 358/513; 358/514; 358/504; 358/505; 358/523; 358/524

(58) Field of Classification Search
None
See application file for complete search history.

(56) References Cited

U.S. PATENT DOCUMENTS

| 7,545,420 | B2 * | 6/2009 | Kondo ........................ 348/248 |
| 8,218,040 | B2 * | 7/2012 | Ito ............................. 348/248 |
| 8,401,328 | B2 * | 3/2013 | Ikeda ......................... 382/274 |
| 2001/0030770 | A1 | 10/2001 | Ohashi ....................... 358/465 |
| 2004/0246858 | A1 | 12/2004 | Saigusa et al. ............. 369/53.31 |
| 2008/0191299 | A1 | 8/2008 | Parks .......................... 257/432 |
| 2008/0316544 | A1 | 12/2008 | Hiromatsu et al. ......... 358/448 |
| 2010/0014775 | A1 * | 1/2010 | Ikeda ......................... 382/274 |

FOREIGN PATENT DOCUMENTS

| CN | 1574913 | 2/2005 |
| CN | 101631200 | 1/2010 |
| EP | 0748113 | 12/1996 |
| JP | 2000-350032 | 12/2000 |
| JP | 2007-201553 | 8/2007 |

OTHER PUBLICATIONS

Russian Office Action dated Mar. 22, 2012 in counterpart Russian Patent Application No. 2011123955, and English translation thereof.
Chinese Office Action dated Jul. 22, 2013 in counterpart Chinese Patent Application No. 201110157624.0 and English language translation thereof.

* cited by examiner

*Primary Examiner* — Cheukfan Lee
(74) *Attorney, Agent, or Firm* — Fitzpatrick, Cella, Harper & Scinto (57) ABSTRACT

Correction of brightness of image data outputted by an image sensor which includes a light emitting portion, a photoelectric conversion portion in which a plurality of photoelectric transducers are arrayed in line, and a charge transfer portion. For a smear occurred at the charge transfer portion, reference smear amount data is stored, corresponding to each of color components of light from the light emitting portion and a correction target pixel. A correction amount for brightness is based on a difference between brightness values of a first color component and a second color component and the reference smear amount data.

23 Claims, 6 Drawing Sheets

IMAGE READING APPARATUS AND IMAGE DATA PROCESSING METHOD

BACKGROUND OF THE INVENTION

1. Field of the Invention

The present invention relates to an image reading apparatus and image data processing method. Particularly, the present invention relates to an image reading apparatus and image data processing method for correcting an abnormal image caused by a smear when reading an image by optically scanning the image original.

2. Description of the Related Art

Some conventional image reading apparatuses use a contact image sensor (to be simply referred to as a CIS) as an image sensor for scanning an original. An apparatus of this type sequentially switches and uses three LEDs for emitting light beams of R, G, and B color components to irradiate the original surface with light. Thus, image data are read out line-sequentially in order of the color components of one line.

Figure 8:
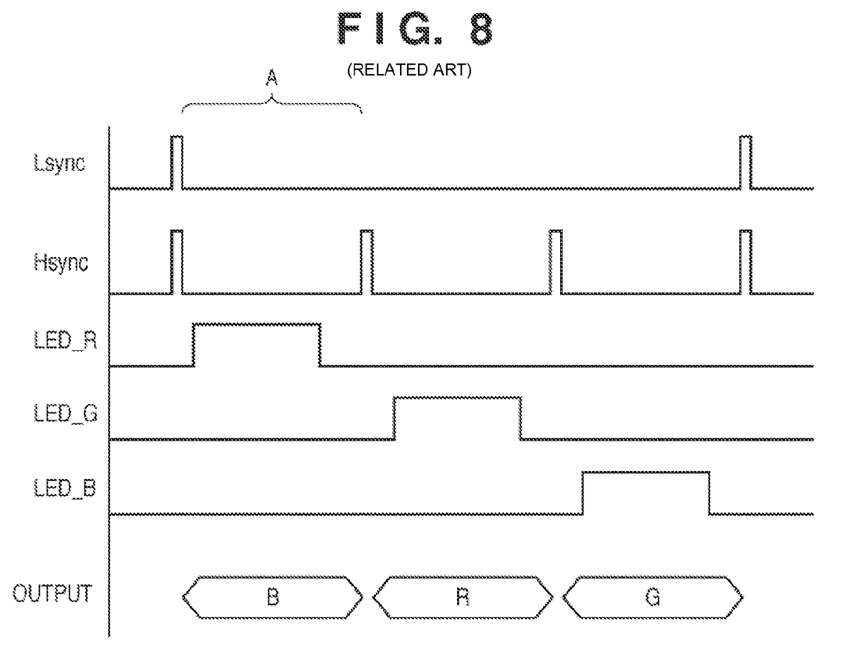
FIG. 8 is a timing chart showing typical timings in line-sequential reading.

FIG. 8 is a timing chart showing LED turn-on and readout in image reading.

As shown in FIG. 8, one line (cycle of a signal $L_{sync}$) is divided into three periods (cycle of a signal $H_{sync}$). LEDs are turned on in order of a red LED LED_R, green LED LED_G, and blue LED LED_B, storing charges. The stored charges are transferred outside the LED during the period of the signal $H_{sync}$ in the next cycle. For example, during period "A", exposure and charge storage by the red LED are performed. At the same time, charges obtained by exposure and charge storage by the blue LED for a preceding line are transferred outside.

Figure 9:
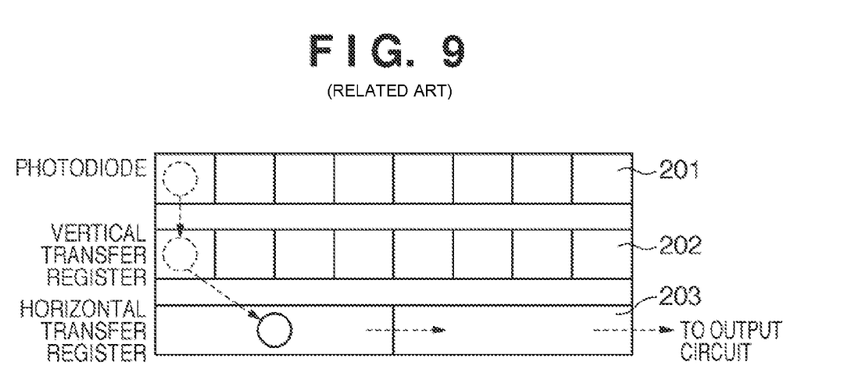
FIG. 9 is a schematic view showing the schematic arrangement of an image sensor.

FIG. 9 is a view showing the schematic arrangement of the image sensor.

The LED irradiates an image original with light. When the light reflected by the image original enters the array of a photodiode 201, charges are stored to generate an image signal. The signal charges stored in the array of the photodiode 201 are sent to a vertical transfer register 202, and held for a period until they are horizontally transferred. At the transfer timing, the signal charges are sent to a horizontal transfer register 203. The signal charges are then transferred to an output circuit (not shown) via the horizontal transfer register 203.

In this arrangement, portions except for the photodiode 201 are shielded from light by an aluminum light shield (not shown) to prevent generation of unwanted charges. However, the light shielding is sometimes insufficient due to layout restrictions of the apparatus and device, or the like. For example, when an aluminum wire for transferring an electrical signal is used even for light shielding and a wire different in potential is arranged, this wire cannot be connected to the signal line. An aluminum wire slit is generated between nonequipotential portions, degrading the light shielding ability compared to the remaining portion. In this case, unwanted light enters from the slit, generating unwanted charges. The unwanted charges are added to a normal signal, outputting a signal higher in strength than the normal signal (signal indicating a brighter state). This phenomenon is called a smear.

A fundamental countermeasure against the smear is to prevent incidence of unwanted light. For example, if a smear occurs due to unwanted light entering a charge transfer portion such as a vertical transfer register or horizontal transfer register, enhancing a light shield above the charge transfer portion so as to prevent incidence of unwanted light can be a fundamental countermeasure. However, the wafer area of the circuit board in recent apparatuses is decreasing for cost reduction, and it becomes difficult to achieve a good aluminum light shielding effect. On the other hand, the degree of aluminum light shielding effect depends on the manufacturing precision of the aluminum light shielding plate, and less varies. This is the structural issue of the aluminum light shielding plate, so a smear occurs at the same location if the incident light quantity is the same.

Conventionally, countermeasures to correct degradation of the image quality caused by the smear have been proposed. For example, in Japanese Patent Laid-Open No. 2007-201553, after charges generated by a plurality of light reception elements effective for image capturing are transferred to a charge transfer portion, correction data is generated based on data obtained from an output signal in an additional transfer operation executed in addition to a transfer operation for the charges received by the charge transfer portion.

However, the conventional technique requires an additional charge transfer operation, prolonging the time taken for image reading. In the conventional technique, since no smear occurrence position is known in advance, it is necessary to locate where the smear occurs. If the detection fails, correction processing becomes less effective. Further in the conventional technique, the amount of exposure by the light emitting element is not always constant. The occurrence amount of every smear varies, impairing the correction effect.

The degree of influence of output level variations caused by the smear changes depending on the irradiation light quantity of the LED. Thus, uniformly subtracting the light quantity does not lead to correction. For example, in a line-sequential reading method of reading out signals by sequentially switching and turning on red, green, and blue LEDs, the brightness levels of the R, G, and B color components change depending on the color balance of an original. The brightness level is a reflected light quantity level obtained from reflected light of light which irradiates an original. When the reflected light quantity level changes, the smear amount also changes, and uniform correction does not work.

In the first place, the smear occurs when charge transfer and exposure are executed simultaneously. Occurrence of the smear can, therefore, be prevented by performing exposure and charge transfer in different periods. However, performing exposure and charge transfer in different periods results in prolonging the image reading time and decreases the performance.

The time necessary for charge transfer may be shortened by quickly executing charge transfer. If the time necessary for charge transfer can be shortened, exposure is performed in the remaining time, enabling execution of charge transfer and exposure in different periods. However, implementation of fast charge transfer requires a high-speed clock, increasing unwanted radiation and noise.

Charge transfer and exposure may be performed in different periods by increasing the irradiation light quantity from the light source to shorten the exposure time. However, introduction of a high-output light source has problems such as high apparatus cost and light quantity variations under the influence of heat generated by the high-output light source.

SUMMARY OF THE INVENTION

Accordingly, the present invention is conceived as a response to the above-described disadvantages of the conventional art.

For example, an image reading apparatus and image data processing method according to this invention are capable of effectively correcting a smear without increasing the cost and degrading the performance.

According to one aspect of the present invention, there is provided an image reading apparatus comprising: an image sensor including a light emitting portion, a photoelectric conversion portion in which a plurality of photoelectric transducers are arrayed in line, and a charge transfer portion which transfers charges stored in the photoelectric conversion portion; a first memory which stores, for a smear occurred at the charge transfer portion, reference smear amount data corresponding to each of color components of light from the light emitting portion and each of the photoelectric transducers; an image processing unit configured to, for image data inputted by the image sensor, obtain a correction amount for a brightness value based on a difference between brightness values of a first color component and a second color component and the reference smear amount data stored in the first memory, and correct a brightness value of the image data inputted by the image sensor based on the correction amount.

According to another aspect of the present invention, there is provided a method for processing image data inputted by an image sensor including a light emitting portion, a photoelectric conversion portion in which a plurality of photoelectric transducers are arrayed in line, and a charge transfer portion which transfers charges stored in the photoelectric conversion portion, comprising: for the image data inputted by the image sensor, obtaining a difference between brightness values of a first color component and a second color component; for a smear occurred at the charge transfer portion, obtaining a reference smear amount data corresponding to each of color components of light from the light emitting portion and each of the photoelectric transducers; obtaining a correction amount for a brightness value from the difference between the brightness values and the reference smear amount data; and correcting a brightness value of the image data inputted by the image sensor based on the correction amount.

The invention is particularly advantageous since the influence of smear can be reduced without increasing the apparatus cost and degrading the reading performance even when reading an image using an image sensor where occurrence of a smear is unavoidable.

Further features of the present invention will become apparent from the following description of exemplary embodiments (with reference to the attached drawings).

DESCRIPTION OF THE EMBODIMENTS

An exemplary embodiment of the present invention will now be described in detail in accordance with the accompanying drawings. It should be noted that the relative arrangement of building components and the like set forth in the embodiment do not limit the scope of the present invention unless it is specifically stated otherwise.

Figure 1:
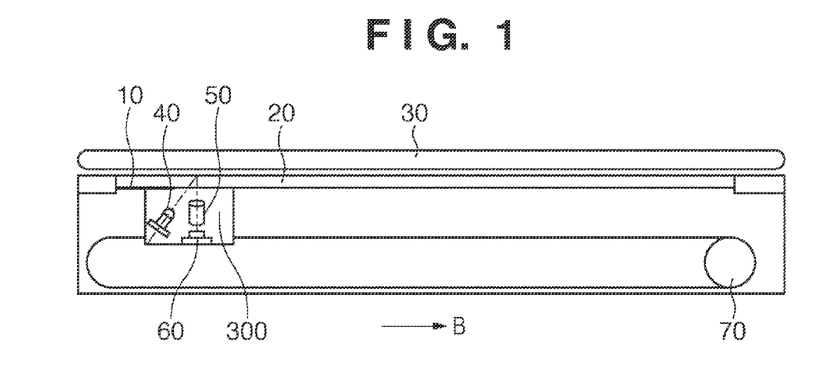
FIG. 1 is a side sectional view showing the schematic arrangement of an image reading apparatus as an exemplary embodiment of the present invention.

FIG. 1 is a side sectional view showing the arrangement of an image reading apparatus (scanner) which reads a reflection original using a CIS as an exemplary embodiment of the present invention.

As shown in FIG. 1, an image original (not shown) is set on a platen glass 20, and an original pressure plate 30 prevents the float of the image original from the platen glass 20. The original pressure plate 30 also functions as a contamination/damage prevention cover for the platen glass 20.

When a light source 40 including an LED lamp and light guide irradiates the image original, a contact image sensor (CIS) 60 reads light reflected by the image original via a lens array 50 without enlargement/reduction. A contact image sensor (CIS) unit 300 is formed from the light source 40 and CIS sensor 60, and arranged in tight contact with the platen glass 20.

In this apparatus, while a motor 70 moves the CIS unit 300 in a direction (sub-scanning direction) indicated by an arrow B, the CIS unit 300 is electrically scanned in a direction (main scanning direction) perpendicular to the drawing sheet surface to read the image original. In general, the motor 70 is a stepping motor, DC motor, or the like. In image reading, a white reference board 10 is irradiated with light, obtaining a reference signal for performing shading correction. The white reference board 10 is generally made of a material with which the tint hardly varies regardless of environmental conditions such as temperature and humidity, and durability.

In this arrangement, when reading an image original, shading correction using the white reference board 10 is executed in advance. At the same time, the dimming operation of the LED light source is performed to keep the exposure amount constant.

Figure 2:
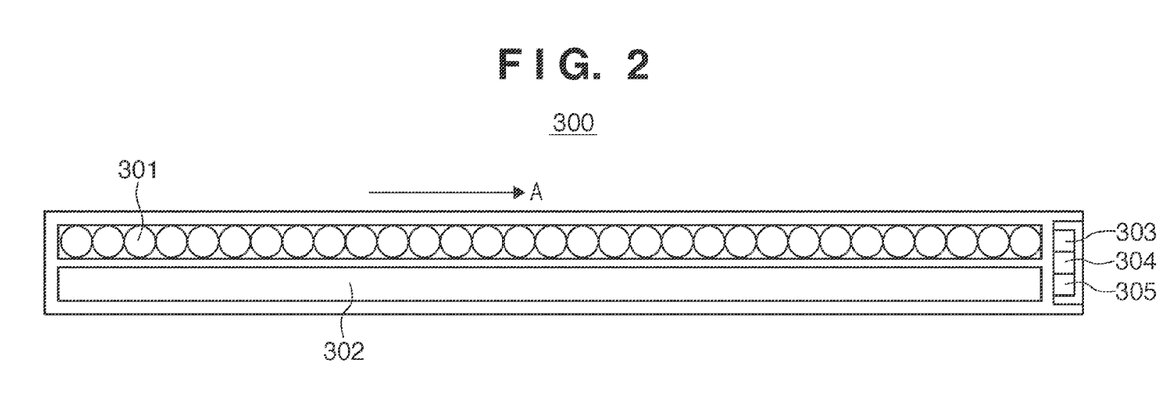
FIG. 2 is a side sectional view showing the detailed structure of a contact image sensor (CIS) unit.

FIG. 2 is a side sectional view showing the detailed structure of the CIS unit 300.

As shown in FIG. 2, the CIS unit 300 includes, in correspondence with the three primary colors of light, a red LED 303 which emits red light, a green LED 304 which emits green light, and a blue LED 305 which emits blue light. In original reading, the respective color LEDs are turned on time-divisionally for each line. The original is uniformly irradiated with the emitted light through a light guide 302, and a SELFOC Lens® 301 condenses the reflected light for each pixel. The light is formed into an image on a photoelectric transducer (not shown: light reception element) in the CIS unit, and the received light is converted into an electrical signal. In this way, an image signal of one line including the color signals of the R, G, and B color components is output. By moving the CIS unit 300 in the sub-scanning direction, an image on the entire original surface is read. Note that the direction of the arrow A indicating the array direction of the cells of the SELFOC Lens® 301 will be called the main scanning direction. The main scanning direction and sub-scanning direction are perpendicular to each other.

In FIG. 1, the main scanning direction is perpendicular to the drawing sheet surface.

As is apparent from this structure of the CIS unit, a plurality of light reception elements are arrayed in line in the CIS unit 300 to form a light reception portion. Hence, a smear potentially readily occurs structurally at the charge transfer portion from the light reception portion of the CIS unit.

Figure 3:
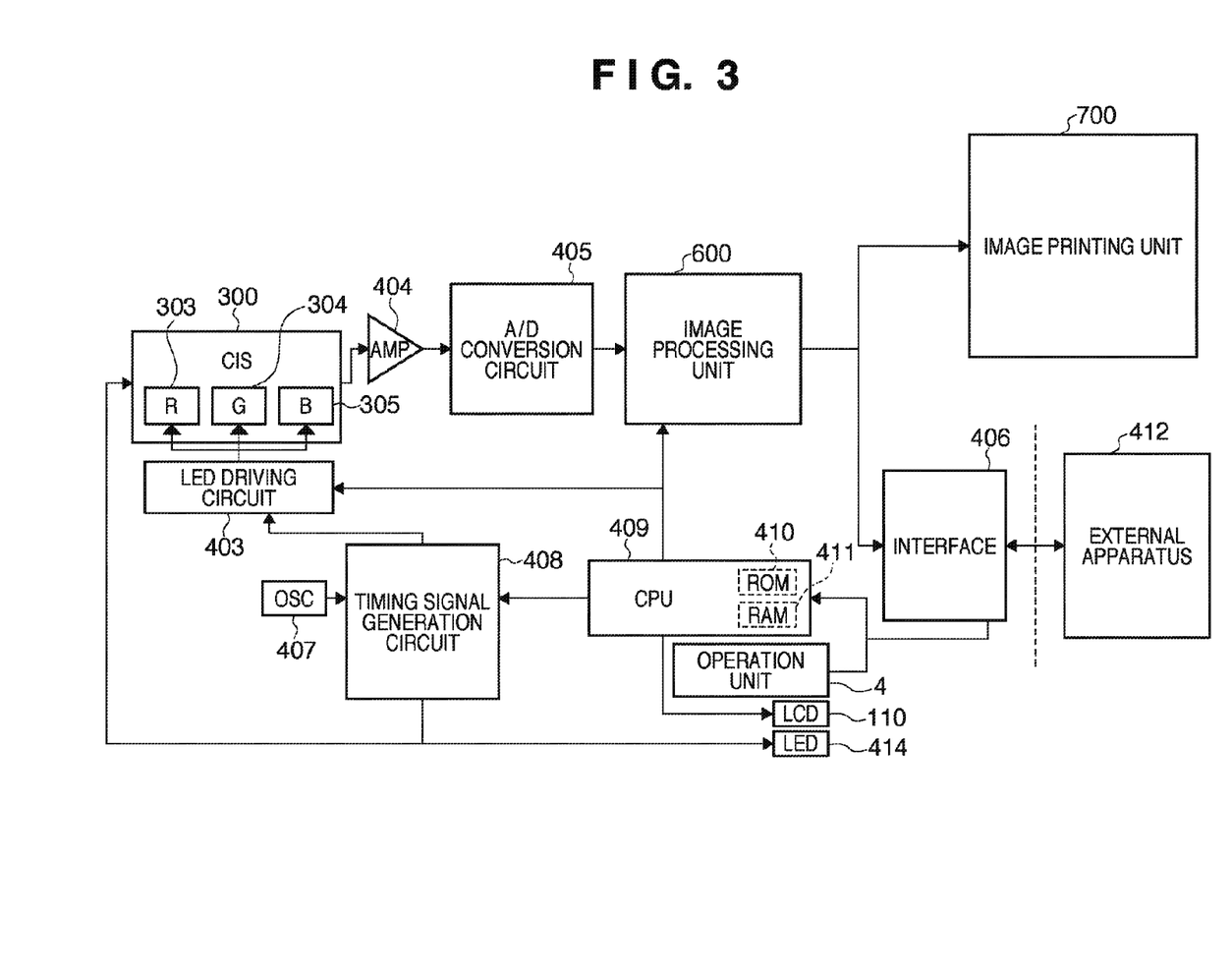
FIG. 3 is a block diagram showing the arrangement of the control circuit of the image reading apparatus.

FIG. 3 is a block diagram showing the arrangement of the control circuit of the image reading apparatus.

The CIS unit 300 line-sequentially reads a color image by switching and turning on the respective color LEDs 303 to 305 for each line by an LED driving circuit 403. The LEDs 303 to 305 are light sources capable of changing the quantity of irradiation light to an original. The LED driving circuit 403 can arbitrarily turn on the LEDs 303 to 305.

In other words, it is possible to sequentially turn on the LEDs 303 to 305 one by one, two of them, or according to circumstances, all the three. An amplifier (AMP) 404 amplifies a signal output from the CIS unit 300. An A/D conversion circuit 405 A/D-converts the amplified electrical signal, outputting, for example, digital image data of 16 bits for each color component of each pixel. An image processing unit 600 processes the digital image data converted by the A/D conversion circuit 405. An interface 406 receives image data from the image processing unit 600, exchanges control data with an external apparatus 412, and outputs image data. The external apparatus 412 is, for example, a personal computer (not shown). The personal computer issues an instruction such as image reading (scanning) to a CPU 409 via the interface 406.

Note that the image reading apparatus shown in FIG. 1 is a single-function (scanner function) apparatus which is connected to the external apparatus 412 and operates. However, the image reading apparatus may be configured as a multi-function printer by integrating it with an image printing unit 700. In this case, image data from the image processing unit 600 can be output to the image printing unit 700.

The image data from the interface 406 is converted into binary data indicating "print" or "not print" for each pixel. An image is printed on a printing medium using a printing material. The image printing unit 700 can be an inkjet printer, a laser beam printer using an electrophotographic method, a sublimation printer, or the like. These printers are well known and a detailed description thereof will be omitted.

The CPU 409 in the form of a microcomputer controls an operation instruction from an operation unit 4. This control is executed by reading out a processing program stored in a ROM 410 by the CPU 409, and executing it using a RAM 411 as a work area. In FIG. 3, a reference signal oscillator (OSC) 407 is, for example, a crystal oscillator. A timing signal generation circuit 408 divides the frequency of an output from the reference signal oscillator 407 in accordance with the settings of the CPU 409, generating various timing signals each serving as the base of an operation.

An LED 414 serves as the backlight of an LCD 110. Lighting of the LED 414 is controlled by a lighting signal output from the timing signal generation circuit 408.

This embodiment will exemplify correction when the line-sequential reading method is adopted, and irradiation light from the red LED affects transfer of charges obtained by irradiation of the blue LED. Note that an arrangement in which charges are stored by reflected light of irradiation light from the red LED and the stored charges are transferred is called an R channel. Similarly, an arrangement in which charges are stored by reflected light of irradiation light from the green LED and the stored charges are transferred is called a G channel. An arrangement in which charges are stored by reflected light of irradiation light from the blue LED and the stored charges are transferred is called a B channel.

First, a method of measuring a smear reference amount will be explained. The influence of smear on the reading result increases in proportion to the difference between the brightness values of the respective color components when a color image original is read. For example, if the R component brightness value=the B component brightness value, the reading result is free from the influence of smear.

However, if the R component brightness value>>the B component brightness value, the influence of smear becomes serious. In this case, it is estimated that the received light quantity of the B channel is very small and that of the R channel is large. The received light quantity of the R channel gives the influence of smear to the B channel, and this result serves as a reading result, affecting read image data. In this manner, the relationship between the R component brightness value level and the B component brightness value level, and the degree of influence of smear on the reading result are measured and set as brightness level conditions and a smear reference amount. For example, provided that each pixel of the R, G, or B color component is represented by 8 bits, the brightness value level of each pixel of the R, G, or B color component varies from 0 to 255. Assume that image data is obtained as a result of reading an image original having an R component brightness value level=200 and a B component brightness value level=20. In this image data, brightness abnormality occurs due to a smear at the position of a pixel affected by the smear. For example, the B component brightness value level is 20. However, if the brightness value of the pixel affected by the smear is 25, correction for the brightness value is needed for obtaining a correct brightness value. This corrected is called smear correction.

Next, a dimming operation will be explained. The image reading apparatus according to the embodiment performs a light source dimming operation before the start of image reading. Since the LED has large individual variations, it is difficult to accurately estimate the smear amount. Thus, the white reference board whose brightness value level is known in advance is read, the lighting period is changed to adjust the output level to a target value so that the quantity of light emitted by the LED is kept constant. By standardizing the light emission quantity, the smear occurrence amount can be estimated.

Figure 4:
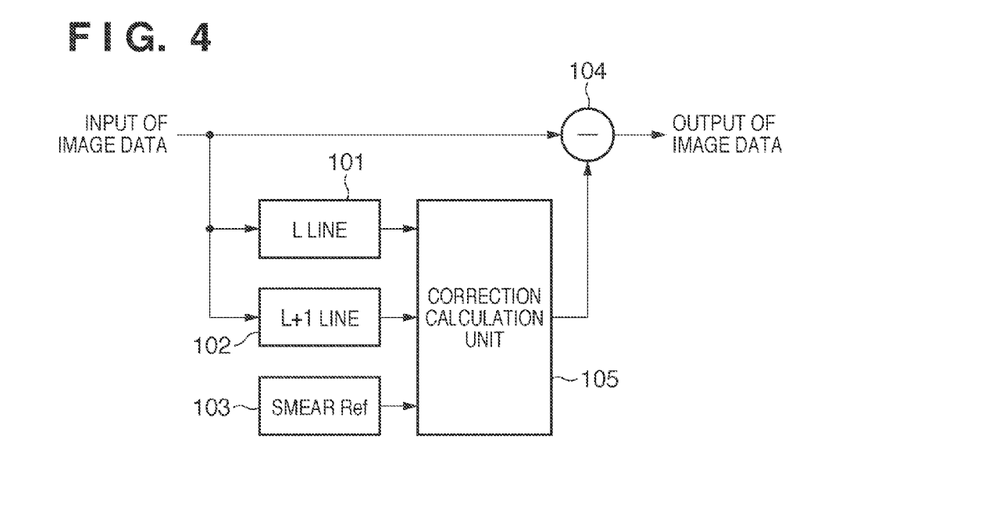
FIG. 4 is a diagram showing an outline of smear correction.

FIG. 4 is a diagram showing an outline of smear correction. In the embodiment, the image processing unit 600 executes the smear correction. The ROM (first memory) of the image processing unit 600 or the like stores predetermined reference smear amount data $(S(B)_{ref})$ 103. The reference smear amount data 103 is a value unique to each correction target pixel. For each color component, data of each pixel in the main scanning direction is stored.

The image processing unit 600 includes two memories 101 and 102 which hold, for each line, data of the R, G, and B color components of two consecutive lines. These memories are also called the second memory with respect to the ROM (first memory) which stores reference smear amount data. The image processing unit 600 further includes a correction calculation unit 105 which calculates a correction amount based on the reference smear amount data 103, current line data and next line data, and a subtracter 104 which subtracts the correction amount S(B) from the correction target pixel. The correction amount is calculated in accordance with equation (1). Note that the subtractor 104 includes a buffer for holding line data. Using the line data held by the buffer, the subtractor 104 performs subtraction for pixels of each line.

That is, $$S(B) = S(B)_{ref} \{(R_1 - B_1)/(R_{1ref} - B_{1ref})\} \quad (1)$$

where S(B) is the correction amount of the B channel, $R_1$ is the R channel brightness value level before correction, $B_1$ is the B channel brightness value level before correction, $S(B)_{ref}$ is the reference level (constant) of a smear amount occurred in the B channel, $R_{1ref}$ is the R channel brightness value level (constant) when the reference level is obtained, and $B_{1ref}$ is the B channel brightness value level (constant) when the reference level is obtained. In other words, equation (1) multiplies a coefficient and a difference between brightness values of two color components. For example, provided that $S(B)_{ref}=5$, $R_{1ref}=220$, and $B_{1ref}=40$, the coefficient value=5/(220−40)=1/36.

Figure 5:
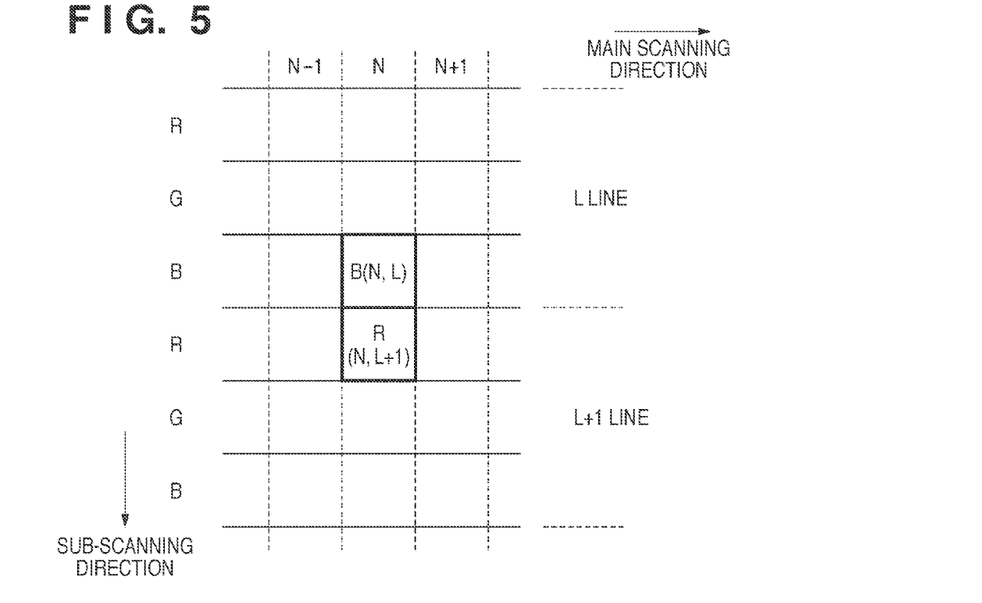
FIG. 5 is a schematic view showing the correction target pixel.

FIG. 5 is a schematic view showing the correction target pixel.

This embodiment employs the line-sequential reading method. Thus, the correction amount is calculated from a brightness value level at the same pixel position in the main scanning direction while the color components adjacent in the sub-scanning direction are different. In the example of FIG. 5, letting R(N,L), G(N,L), and B(N,L) be data of the R, G, and B color components in N pixel on L line, the correction amount for B(N,L) is calculated based on the brightness value level of R(N,L+1) and the brightness value level of B(N,L). The image processing unit 600 corrects B(N,L) based on the correction amount for B(N,L). Similar processing is made for the next (L+1) line. More specifically, the image processing unit 600 calculates the correction amount for B(N,L+1) based on the brightness value level of R(N,L+2) and the brightness value level of B(N,L+1). Then, the image processing unit 600 corrects B(N,L+1) based on the correction amount for B(N,L+1).

When the image processing unit 600 described with reference to FIG. 4 is used, the memory 101 stores image data of L line, and the memory 102 stores that of (L+1) line. The correction amount is calculated according to equation (1) using image data of the R channel on (L+1) line, image data of the B channel on L line, and the reference smear amount. In a case where the next line is to be processed, the image processing unit 600 performs control to store image data of (L+2) line into the memory 101.

Figure 6:
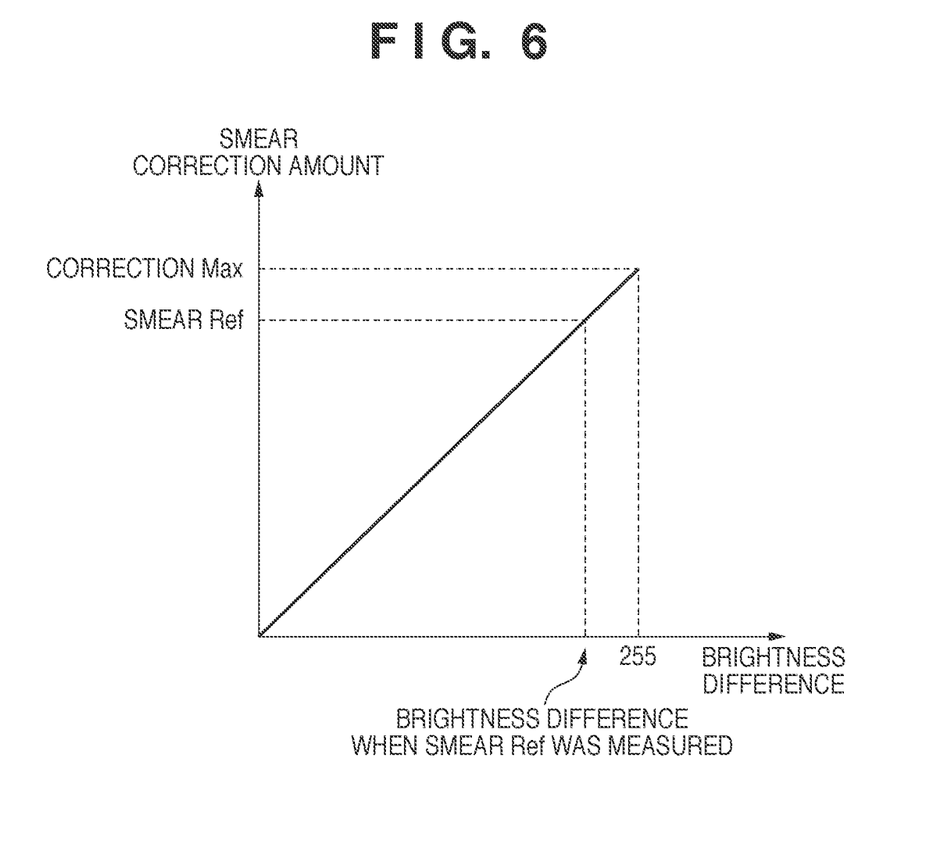
FIG. 6 is a graph showing the correlation between the density difference and the correction amount.

FIG. 6 is a graph showing the correlation between the density difference and the correction amount. The reference amount serving as the base of the smear correction amount is measured under a given condition. As shown in FIG. 6, a straight line connecting a density difference at that time and the origin is the relation between the correction amount and the density difference.

Figure 7:
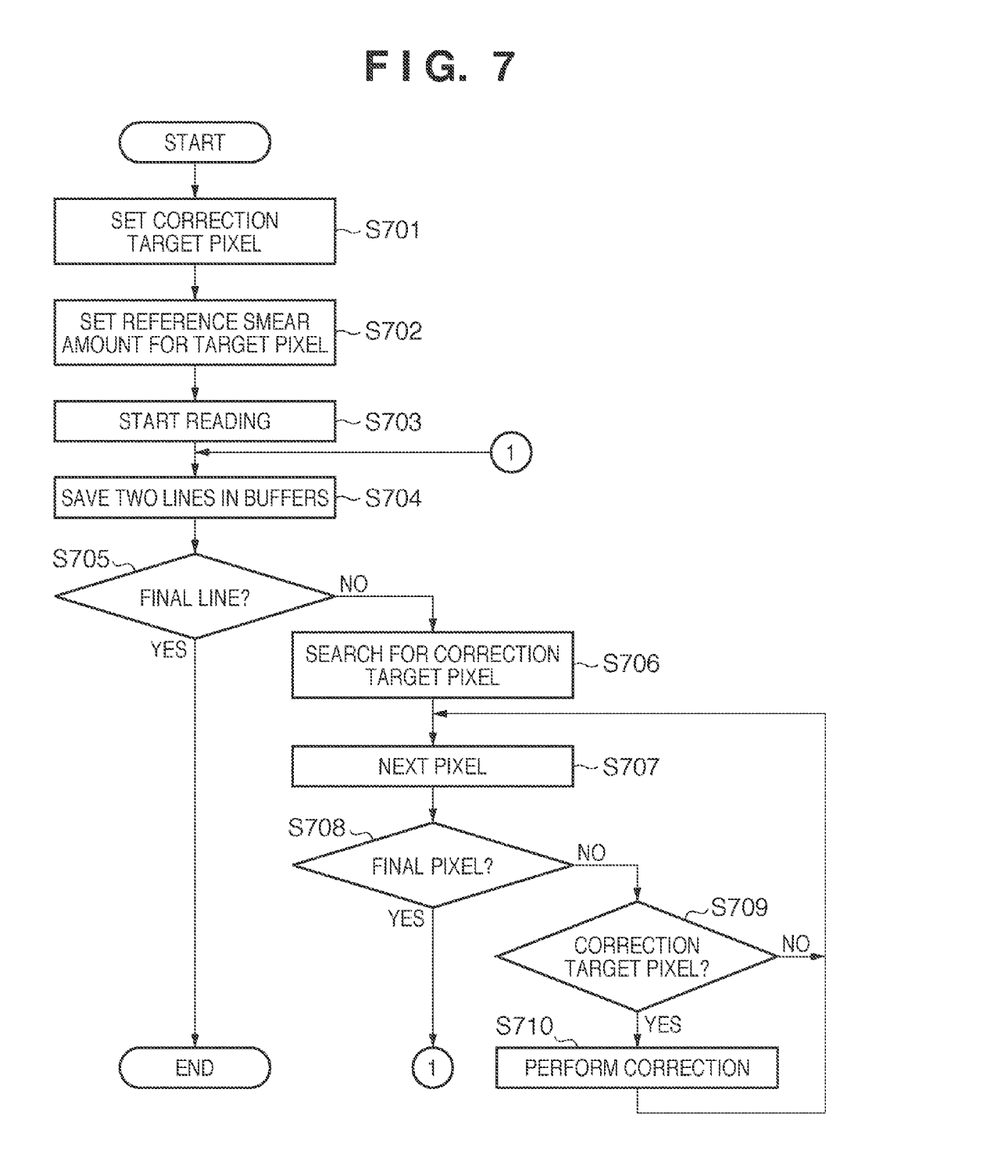
FIG. 7 is a flowchart showing an outline of smear correction processing.

FIG. 7 is a flowchart showing an outline of smear correction processing.

First in an image reading apparatus in which smear correction is implemented, a pixel where a smear occurs is located, and the located pixel is set as a pixel address in step S701. In step S702, a reference smear amount corresponding to the pixel address set in step S701 is set. The reference smear amount has been calculated based on a smear amount measured in advance for each pixel.

In step S703, reading of an image original starts. Then, in step S704, the memories 101 and 102 functioning as line buffers store image data of two lines. In step S705, it is determined whether or not the processing line has reached the final line. If the processing line has not reached the final line, the process advances to step S706 to start searching for a correction target pixel. To the contrary, if the processing line has reached the final line, the process ends. In this case, the line is an image reading line in the sub-scanning direction.

In step S707, pixels are checked in order in the main scanning direction. In step S708, it is confirmed whether or not the search target pixel has reached the final pixel in the main scanning direction on the processing target line. If the search target pixel has reached the final pixel, the process advances to step S704. If the search target pixel has not reached the final pixel yet, the process advances to step S709 to check whether or not the search target pixel is the correction target pixel. If the search target pixel is the correction target pixel, the process advances to step S710 to perform the correction described with reference to FIGS. 4 and 5. If the search target pixel is not the correction target pixel, the process advances to step S707 without performing the correction.

According to the above-described embodiment, while charges are stored upon irradiation of an LED of a given color, the correction amount is obtained using a reference smear amount which has been measured in advance and stored. The brightness value level can be corrected using the correction amount. Even when charge storage for a given color component and charge transfer for another color component are simultaneously performed for image reading according to the line-sequential reading method, the smear can be corrected, implementing more accurate image reading. In the above-described embodiment, the correction coefficient for B(N,L) is calculated based on the brightness value level of R(N,L+1). However, the correction amount for B(N,L) may be calculated further based on the brightness value level of R(N+1,L+1) and that of R(N−1,L+1). More specifically, and the image processing unit 600 calculates the correction amount for R(N,L) based on the brightness value level of R(N,L) and the brightness value level of G(N,L). The image processing unit 600 corrects R(N,L) based on the correction amount for R(N,L). Similarly, the image processing unit 600 calculates the correction amount for G(N,L) based on the brightness value level of G(N,L) and the brightness value level of B(N,L). Then, the image processing unit 600 corrects G(N,L) based on the correction amount for G(N,L).

The embodiment is also advantageous since the apparatus is capable of correcting a smear at low cost because an arrangement using a special element or device is unnecessary. In addition, charge storage for a given color component and charge transfer for another color component can be executed simultaneously, so the reading speed can be kept high.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-135511, filed Jun. 14, 2010, which is hereby incorporated by reference herein in its entirety.

What is claimed is:

1. An image reading apparatus comprising:
an image sensor including a light emitting portion, a photoelectric conversion portion in which a plurality of photoelectric transducers are arrayed in line, and a charge transfer portion which transfers charges stored in the photoelectric conversion portion, configured to output image data corresponding to a plurality of pixels;
a first memory which stores, for a smear occurred at the charge transfer portion, reference smear amount data corresponding to each of color components of light from the light emitting portion and a correction target pixel;
an image processing unit configured to, for image data outputted by the image sensor, obtain a correction amount for a brightness value based on a difference between brightness values of a first color component and a second color component and the reference smear amount data stored in the first memory, and correct a brightness value of the image data outputted by the image sensor based on the correction amount.

2. The apparatus according to claim 1, further comprising a conversion unit configured to A/D-convert the charge transferred from the charge transfer portion.

3. The apparatus according to claim 1, further comprising a moving unit configured to move the image sensor in a direction diagonal to an array direction of the plurality of photoelectric transducers.

4. The apparatus according to claim 1, further comprising a second memory which stores image data of at least two lines outputted by the image sensor.

5. The apparatus according to claim 1, wherein the light emitting portion irradiates an original with light, and the photoelectric conversion portion receives the light reflected by the original.

6. The apparatus according to claim 1, wherein the reference smear amount data is obtained in advance by measurement.

7. The apparatus according to claim 1, further comprising a holding unit configured to hold light emission quantities of three light sources included in the light emitting portion constant.

8. The apparatus according to claim 1, wherein the obtained correction amount is changed based on lighting periods of three light sources included in the light emitting portion.

9. The apparatus according to claim 1, wherein the light emitting portion includes a first light emitting device, a second light emitting device, and a driver for time-divisionally turning on the first and second emitting devices.

10. The apparatus according to claim 1, wherein light sources included in the light emitting portion includes a red LED which emits red light, a green LED which emits green light, and a blue LED which emits blue light.

11. A method for processing image data outputted by an image sensor including a light emitting portion, a photoelectric conversion portion in which a plurality of photoelectric transducers are arrayed in line, and a charge transfer portion which transfers charges stored in the photoelectric conversion portion, comprising:
    outputting image data corresponding to a plurality of pixels;
    for the image data outputted by the image sensor, obtaining a difference between brightness values of a first color component and a second color component;
    for a smear occurred at the charge transfer portion, obtaining a reference smear amount data corresponding to each of color components of light from the light emitting portion and a correction target pixel;
    obtaining a correction amount for a brightness value from the difference between the brightness values and the reference smear amount data; and
    correcting a brightness value of the image data outputted by the image sensor based on the correction amount.

12. An apparatus comprising:
    a first obtaining unit constructed to obtain image data, corresponding to a plurality of pixels, outputted from an image sensor which includes a light source, a photoelectric conversion portion in which a plurality of photoelectric transducers are arrayed, and a transfer portion which transfers charges stored in the photoelectric conversion portion;
    a second obtaining unit which, with respect to a smear occurred at the transfer portion, is constructed to obtain information on a reference smear amount corresponding to a first color component of light emitted by the light source and corresponding to a correction target pixel; and
    a correction unit which, based on a brightness value difference between a brightness value of a first color component of the image data obtained by the first obtaining unit and a brightness value of a second color component of the image data obtained by the first obtaining unit, and based on the information on the reference smear amount obtained by the second obtaining unit, is constructed to correct the brightness value of the first color component of the image data obtained by the first obtaining unit.

13. The apparatus according to claim 12, wherein the correction unit is further constructed to obtain a correction amount of the brightness value of the first color component of the image data, based on the brightness value difference and the information on the reference smear amount, and to correct the brightness value of the first color component of the image data obtained by the first obtaining unit, based on the correction amount of the brightness value of the first color component of the image data.

14. The apparatus according to claim 13, wherein the correction unit is further constructed to obtain a correction amount of the brightness value of the first color component of the image data, based on a brightness value difference between a brightness value of the first color component of the image data when the reference smear amount occurs and a brightness value of the second color component of the image data when the reference smear amount occurs, and based on the information on the reference smear amount.

15. The apparatus according to claim 13, wherein the image data obtained by the first obtaining unit is obtained by emitting the first color component of the light from the light source, and then continuously emitting the second color component of the light from the light source, and
    wherein the correction amount is obtained from the brightness value of the first color component of the image data obtained by the first obtaining unit and the brightness value of the second color component of the image data obtained by the first obtaining unit at a same pixel position in a direction in which the plurality of photoelectric transducers are arrayed.

16. The apparatus according to claim 12, wherein the image data obtained by the first obtaining unit is obtained by emitting the first color component of the light from the light source, and then continuously emitting the second color component of the light from the light source.

17. The apparatus according to claim 12, wherein the reference smear amount is specific to a position of the correction target pixel in a direction in which the plurality of photoelectric transducers are arrayed.

18. The apparatus according to claim 12, wherein the image data obtained by the first obtaining unit is obtained by line-sequentially reading an image original while moving the image sensor.

19. The apparatus according to claim 12, wherein the light source time-divisionally emits each color component for each line.

20. The apparatus according to claim 12, further comprising the image sensor.

21. The apparatus according to claim 12, further comprising an image processing unit.

22. The apparatus according to claim 12, further comprising a memory unit for storing the information on the reference smear amount.

23. A method comprising:
    obtaining image data, corresponding to a plurality of pixels, outputted from an image sensor which includes a light source, a photoelectric conversion portion in which a plurality of photoelectric transducers are arrayed, and a transfer portion which transfers charges stored in the photoelectric conversion portion;

for a smear occurred at the transfer portion, obtaining information on a reference smear amount corresponding to a first color component of light emitted by the light source and corresponding to a correction target pixel; and
based on a brightness value difference between a brightness value of a first color component of the obtained image data and a brightness value of a second color component of the obtained image data, and based on the obtained information on the reference smear amount, correcting the brightness value of the first color component of the obtained image data.

\* \* \* \* \*